2,730,103
MAGNETOSTRICTIVE CUTTING TOOL

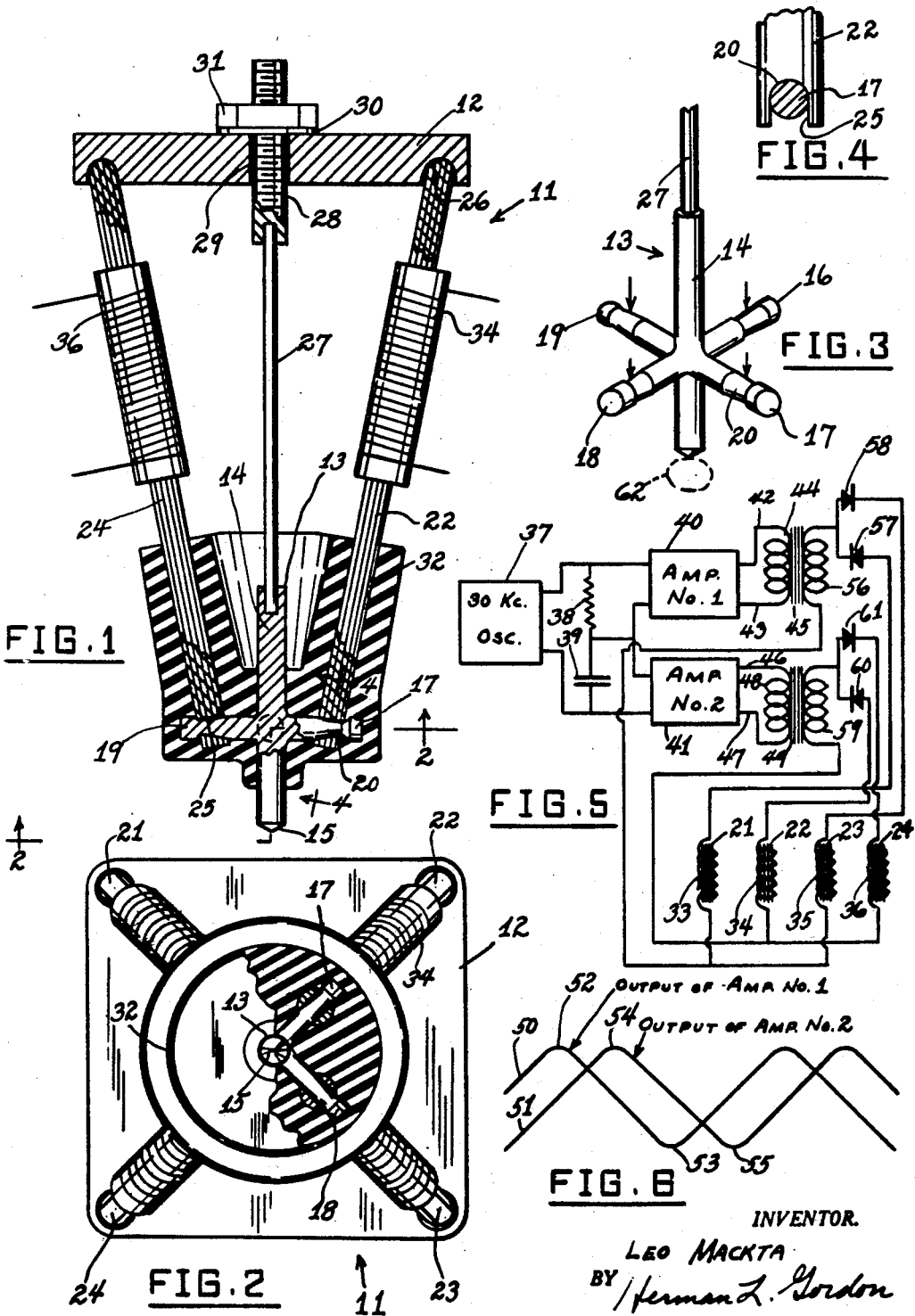
Jan. 10, 1956     L. MACKTA     2,730,103
MAGNETOSTRICTIVE CUTTING TOOL
Filed Nov. 22, 1954
INVENTOR.
LEO MACKTA
BY Herman L. Gordon
ATTORNEY

United States Patent Office 2,730,103
Patented Jan. 10, 1956

Leo Mackta, Brooklyn, N. Y.

Application November 22, 1954, Serial No. 470,347

10 Claims. (Cl. 128—305)

This invention relates to electromechanical oscillatory devices, and more particularly to a magnetostrictive cutting tool adapted to be driven by pulses of electrical energy of relatively high frequency.

A main object of the invention is to provide a novel and improved magnetostrictive cutting tool whose cutting tip is vibrated with a rotary motion at a relatively high frequency, such as an ultrasonic frequency, said tool being relatively simple in construction, having a highly efficient cutting action, especially in side cutting, as practised in dentistry, and involving relatively few mechanical parts.

A further object of the invention is to provide an improved magnetostrictive cutter wherein the cutting tip is driven in a substantially circular path at an ultrasonic rate.

A still further object of the invention is to provide an improved magnetostrictive cutter which is inexpensive to manufacture, which is durable in construction, and which provides an improved cutting action as over the cutting tools heretofore employed.

Further objects and advantages of the invention will become apparent from the following description and claims, and from the accompanying drawings, wherein:

Figure 1 is an enlarged vertical cross-sectional view taken through an improved magnetostrictive cutting tool constructed in accordance with the present invention.

Figure 2 is a horizontal cross-sectional view taken on line 2—2 of Figure 1.

Figure 3 is a fragmentary perspective detail view showing the tool bit of the cutting tool of Figures 1 and 2.

Figure 4 is an enlarged cross-sectional detail view taken on line 4—4 of Figure 1.

Figure 5 is a schematic wiring diagram of a driving circuit for the cutting tool of Figures 1 to 4.

Figure 6 is a graph showing the wave forms of the output voltages of the amplifiers of Figure 5 and indicating the time sequence of the driving pulses delivered to the respective magnetostrictive cores of the cutting tool of Figures 1 to 4.

Referring to the drawings, the improved magnetostrictive cutting tool is designated generally at 11. The tool 11 comprises a main supporting plate 12, which may be of any suitable shape, for example, square, as illustrated. Designated generally at 13 is a tool bit, said bit comprising a shank 14 terminating in a suitable cutting tip 15. Integrally formed with the shank 14 and projecting from the intermediate portion thereof are four equally spaced identical arms 16, 17, 18 and 19, said arms being thus spaced apart by angles of 90 degrees. Each arm is reduced in thickness adjacent its end to define a generally conical bearing portion 20.

Designated at 21, 22, 23 and 24 are respective identical laminated magnetostrictive cores formed at their lower ends with rounded notches 25 engaged on the respective bearing portions 20 of the arms 16, 17, 18 and 19. The top ends of the cores are rounded and are received in respective rounded bearing recesses 26 formed in the underside of the plate 12 adjacent the respective corners thereof.

Designated at 27 is a flexible tension rod having its lower end fixedly secured in the top end portion of shank 14 and having its upper end fixedly secured in the lower end of a threaded stud 28 engaged through a central aperture 29 formed in plate 12. A bearing washer 30 and a clamping nut 31 are engaged on the stud 28 above plate 12, as shown.

Nut 31 is preferably adjusted to provide a predetermined initial tension in rod 27 sufficient to insure positive contact of the ends of the respective cores 21 to 24 with the bearing portions 20 and the bearing seats 26. The rod 27 is suitably dimensioned to vibrate resonantly at the supersonic driving frequency with the aid of the adjustment of tension in rod 27 which may be produced by nut 31.

Designated at 32 is a sheath of relatively light resilient deformable material, such as rubber, or the like, which surrounds the lower portion of the tool bit 13 and the lower portions of the cores 21 to 24, so that these portions of the tool are protected from damage from particles of the abrasive suspension used wth the tool.

Mounted on the respective cores 21 to 24 are the respective driving coils 33, 34, 35 and 36 which are energized in quadrature, so as to successively excite the respective magnetostrictive cores 21 to 24 at a supersonic frequency.

Any suitable driving circuit may be employed to provide the successive exciting pulses for the coils 33 to 36. Thus, in Figure 5, 37 designates a 30 kc. oscillator, across the output conductors of which is connected a phase shifting network comprising a resistance 38 connected in series with a capacitance 39. Connected across the resistance 38 is a first amplifier 40 and connected across the capacitance 39 is a second amplifier 41. The output terminals of amplifier 40 are connected by wires 42 and 43 to the primary 44 of a first transformer 45. The output terminals of amplifier 41 are connected by wires 46 and 47 to the primary 48 of a second transformer 49.

The output voltage of amplifier 40 may be represented by the sine wave 50 in Figure 6, and the output voltage of amplifier 41 may be similarly represented by the sine wave 51. As shown, the waves 50 and 51 are 90 degrees out of phase. Wave 50 has the positive peaks 52 and the negative peaks 53. Wave 51 has the positive peaks 54 and the negative peaks 55. Positive peak 54 follows positive peak 52 at a time corresponding to a 90 degree lag, negative peak 53 follows peak 54 at a time corresponding to another 90 degree lag, and peak 55 follows peak 53 at a time corresponding to a further 90 degree lag.

As shown, the secondary 56 of transformer 45 is connected to coils 33 and 35 through respective oppositely connected half-wave rectifiers 57 and 58. Similarly, the secondary 59 of transformer 49 is connected to coils 34 and 36 through respective oppositely connected half-wave rectifiers 60 and 61. Thus, respective pulses of rectified current, separated 90 degrees in phase, are applied to the respective coils 33, 34, 35 and 36, the pulse in coil 33 occurring simultaneously with the peak 52, the pulse in coil 34 occurring with the peak 54, the pulse in coil 35 occurring with the peak 53, and the pulse in coil 36 occurring with the peak 55.

The quadrature-spaced pulses produce similarly spaced successive magnetostrictive vibratory expansion impulses in the cores 21 to 24, which are transmitted to the arms 16 to 19, causing the cutter tip 15 to be rotated through a substantially circular path, such as that shown in perspective by the dotted ellipse 62 in Figure 3, and causing the cutter shank to describe a substantially conical surface.

It will be understood that an expansion of a core is produced by a pulse of current through its coil regardless of the direction of flow of the current. When the current is removed, the core contracts to normal length. Therefore, although the current pulses in the respective cores 33 and 35, for example, flow in opposite directions, the mechanical effects produced by these currents are substantially the same, although separated 180 degrees in phase (in accordance with the phase separation of the wave peaks 52 and 53 in Figure 6).

The cores 21 to 24 are of the laminated type and are suitably dimensioned to resonate at the chosen operating supersonic frequency, which may be, for example, a frequency within the range between 20 kc. and 100 kc. The core laminations may be formed of suitable nickel alloy, or other suitable material customarily employed for magnetostriction cores.

After a core has been excited by a pulse, the core contracts and the tool bit arm engaged thereby returns to a neutral position by the reaction of the tension rod 27. Rod 27 is preferably formed from material of good elasticity and low mechanical hysteresis, such as high quality steel or steel alloy. The rod 27 will be set into vibration in two vertical planes perpendicular to each other, and the vibrations will be separated in phase in a manner to produce the rotary motion of the tool tip 15.

Presently used magnetostrictive cutting tools operate at supersonic frequencies, for example, between 25 kc. and 75 kc., with a simple linear motion. An abrasive suspension at the tool point does the actual cutting. The tool of the present invention provides substantially improved flexibility because of the rotary motion of the tool tip, which is very helpful in many types of cutting operations, for example, in side cutting.

While a specific embodiment of an improved magnetostrictive cutting tool has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A cutting tool comprising a support, a tool bit having a cutting tip, means connecting said tool bit to said support, and electromagnetic means arranged to vibrate said tool bit in a manner causing said cutting tip to move in a substantially circular path and causing said bit to describe a substantially conical surface.

2. In a cutting tool, a support, a tool bit movably mounted, and electromagnetic means on said support arranged to vibrate said tool bit around a point spaced from its tip in a manner to cause said bit to describe a substantially conical surface and arranged to move the tip of the bit in a non-linear path.

3. In a cutting tool, a support, a tool bit, flexible means connecting said tool bit to the support, and electromagnetic means arranged between the tool bit and the support and being arranged to vibrate the tool bit around a point spaced from the tip of the bit in a manner to cause said bit to describe a substantially conical surface.

4. In a cutting tool, a support, a tool bit, flexible means connecting the tool bit to the support, and electromagnetic means arranged between the tool bit and the support and being arranged to vibrate the tool bit around a point spaced from the tip of the bit in a manner to cause said bit to describe a substantially conical surface, said electromagnetic means being further arranged to move the tip of the bit in a substantially circular path.

5. In a cutting tool, a support, a tool bit, flexible means connecting the tool bit to the support, and electromagnetic means arranged between the tool bit and the support and being arranged to vibrate the tool bit around a point spaced from the tip of the bit in a manner to cause said bit to describe a substantially conical surface, said electromagnetic means comprising a plurality of spaced magnetostriction elements disposed between the bit and the support.

6. In a cutting tool, a support, a tool bit, flexible means connecting said tool bit to the support, a plurality of spaced magnetostrictive cores disposed between the bit and the support and engaging the bit and the support at their respective ends, respective driving coils on the cores, and means energizing said coils in sequence, said cores being arranged to vibrate the bit around a point spaced from its tip responsive to the sequential excitation of the cores in a manner to cause said bit to describe a substantially conical surface.

7. In a cutting tool, a support, a tool bit, flexible means connecting said tool bit to the support, a plurality of evenly spaced magnetostrictive cores disposed between the bit and the support and engaging the bit and the support at their respective ends, respective driving coils on the cores, and means energizing said coils in a regular sequence, said cores being arranged to vibrate the bit around a point spaced from its tip responsive to the sequential excitation of the cores in a manner to cause said bit to describe a substantially conical surface.

8. In a cutting tool, a support, a tool bit, flexible means connecting said tool bit to the support, a plurality of evenly spaced magnetostrictive cores disposed between the bit and the support and engaging the bit and the support at their respective ends, respective driving coils on the cores, a generator of evenly spaced pulses, and means sequentially connecting said generator to the respective coils, whereby said coils are energized in regular sequence.

9. In a cutting tool, a support, a tool bit, flexible means connecting said tool bit to the support, a plurality of evenly spaced magnetostrictive cores disposed between the bit and the support and engaging the bit and the support at their respective ends, respective driving coils on the cores, a generator of evenly spaced electrical pulses, means sequentially connecting said generator to the respective coils, whereby said coils are energized in regular sequence, and means arranged to vibrate the bit around a point spaced from its tip responsive to the sequential excitation of the cores in a manner to cause said bit to describe a substantially conical surface.

10. In a cutting tool, a support, a tool bit, flexible means connecting said tool bit to the support, four evenly spaced magnetostrictive cores disposed around the bit and engaging the bit and the support at their respective ends, respective driving coils on the cores, a generator of evenly spaced electrical pulses, means sequentially connecting said generator to the respective coils, whereby said coils are energized in regular sequence, and means arranged to vibrate the bit around a point spaced from its tip responsive to the sequential excitation of the cores in a manner to cause said bit to describe a substantially conical surface, whereby the tip of the bit is moved in a substantially circular path.

References Cited in the file of this patent

UNITED STATES PATENTS

| | | |
|---|---|---|
| 1,768,377 | Serduke | June 24, 1930 |
| 1,966,446 | Hayes | July 17, 1934 |
| 2,249,906 | Longoria | July 22, 1941 |
| 2,452,211 | Rosenthal | Oct. 26, 1948 |
| 2,480,737 | Jayle | Aug. 30, 1949 |
| 2,710,000 | Cromer et al. | June 7, 1955 |